United States Patent
Nagai et al.

(10) Patent No.: US 8,916,254 B2
(45) Date of Patent: Dec. 23, 2014

(54) METHOD FOR MANUFACTURING LAMINATED CORE AND LAMINATED CORE

(75) Inventors: Akira Nagai, Kitakyusyu (JP); Jin Oda, Kitakyusyu (JP); Tatsuhiko Mizutani, Toyota (JP); Yosuke Kurono, Miyoshi (JP)

(73) Assignees: Mitsui High-Tec, Inc, Fukuoka (JP); Toyota Jidosha Kabushiki Kaisha, Aichi (JP)

( * ) Notice: Subject to any disclaimer, the term of this patent is extended or adjusted under 35 U.S.C. 154(b) by 520 days.

(21) Appl. No.: 13/319,890

(22) PCT Filed: Apr. 23, 2010

(86) PCT No.: PCT/JP2010/057264
§ 371 (c)(1),
(2), (4) Date: Nov. 10, 2011

(87) PCT Pub. No.: WO2010/131560
PCT Pub. Date: Nov. 18, 2010

(65) Prior Publication Data
US 2012/0058313 A1    Mar. 8, 2012

(30) Foreign Application Priority Data

May 14, 2009 (JP) .................................. 2009-117839

(51) Int. Cl.
*B32B 3/02* (2006.01)
*H02K 1/16* (2006.01)
*H02K 15/02* (2006.01)

(52) U.S. Cl.
CPC ................ *H02K 1/16* (2013.01); *H02K 15/024* (2013.01)
USPC ............. 428/64.1; 310/216.004; 310/216.055

(58) Field of Classification Search
CPC ......... H02K 1/16; H02K 1/165; H02K 15/02; H02K 15/024
USPC .................. 428/64.1; 310/216.048, 216.004, 310/216.011, 216.055
See application file for complete search history.

(56) References Cited

U.S. PATENT DOCUMENTS 3,590,208 A  *  6/1971  Martini et al. .................. 219/92
5,894,182 A  *  4/1999  Saban et al. ........... 310/216.048
(Continued)

FOREIGN PATENT DOCUMENTS

CN     1156317      8/1997
JP     2001-313210  11/2001
(Continued)

OTHER PUBLICATIONS

Japan Office action, dated May 7, 2013 along with an English language translation thereof.
(Continued)

*Primary Examiner* — Gerard Higgins
(74) *Attorney, Agent, or Firm* — Greenblum & Bernstein, P.L.C.

(57) ABSTRACT

A method for manufacturing a laminated core is provided that makes positions of boundary parts of laminated blocks and improves an efficiency of a welding operation of the blocks. The above-described object is achieved by the method of manufacturing the laminated core 10 including a process that forms a plurality of blocks 12 having a plurality of welding parts 13 to 15 of different forms or colors at intervals of prescribed angles in the circumferential direction, a process that laminates the plurality of blocks 12 under a state that the blocks are rotated at intervals of the prescribed angles and a process that welds the welding parts 13 to 15 having the different forms or colors of the laminated blocks 12 to form integrally the plurality of blocks 12.

3 Claims, 9 Drawing Sheets

(56) References Cited

U.S. PATENT DOCUMENTS

| | | |
|---|---|---|
| 5,942,831 A | 8/1999 | Yamada et al. |
| 7,531,936 B2 | 5/2009 | Fukasaku et al. |
| 2006/0267443 A1 | 11/2006 | Fukasaku et al. |
| 2008/0166581 A1* | 7/2008 | Grott et al. .................... 428/594 |

FOREIGN PATENT DOCUMENTS

| | | |
|---|---|---|
| JP | 2007-159300 | 6/2007 |
| JP | 2007-282301 | 10/2007 |
| JP | 2007-282358 | 10/2007 |
| JP | 2008-271680 | 11/2008 |
| JP | 2010-154589 | 7/2010 |

OTHER PUBLICATIONS

China Office action, dated Jun. 11, 2013 along with an English translation language thereof.

U.S. Appl. No. 13/377,938 to Akira Nagai et al., filed Dec. 13, 2011.

* cited by examiner

METHOD FOR MANUFACTURING LAMINATED CORE AND LAMINATED CORE

TECHNICAL FIELD

The present invention relates to a laminated core formed with a plurality of laminated core pieces and a method for manufacturing a laminated core.

BACKGROUND ART

A motor is known that includes a stator which generates a magnetic field, a movable member which takes out rotational energy and a housing which accommodates them. The stator used in such a motor includes a laminated core formed by laminating a plurality of metal plates to reduce an eddy-current loss and a winding wound on the laminated core. The laminated core of the stator is formed in such manner as described below (see patent literature 1).

Initially, a metal plate such as an electromagnetic steel plate is stamped to a form of the stator (substantially in a ring shape) by a stamping work to obtain a core piece. Then, a plurality of core pieces are laminated by caulking caulk parts respectively provided in the core pieces to form a block. A plurality of blocks formed in such a way are prepared.

At this time, since the metal plate has deviation in the thickness of the plate due to a rolling process, the thickness (a dimension in a direction of lamination) of the blocks respectively formed by laminating the core pieces stamped from the rolled metal plates is not uniform in the circumferential direction. Thus, to make uniform the thickness of the core as a final product in the circumferential direction, under a state that the blocks are respectively rotated by a prescribed angle, the blocks are laminated. Then, in boundary positions of the laminated blocks respectively, welding parts provided in a plurality of positions of the core pieces in the circumferential direction are welded mutually to form integrally the blocks, so that the laminated core is obtained.

PRIOR ART REFERENCE

Patent Literature

Patent Literature 1: JP-A-2007-159300

SUMMARY OF INVENTION

Problems that the Invention is to Solve

However, in the above-described manufacturing method, since the thicknesses of the blocks are respectively uneven in the circumferential direction, the boundaries of the blocks to be welded are respectively rippled in the direction of thickness along the circumferential direction. Accordingly, since the positions of the plurality of welding parts are uneven in the direction of thickness, the welding parts in the boundaries of the blocks need to be respectively visually recognized and then welded. However, since the forms of the blocks are respectively the same, it is extremely difficult to visually recognize the welding parts located in the boundaries of the blocks. Thus, an efficiency of a welding operation is deteriorated.

When the welding positions are improper, the bonding strength of the blocks is respectively lowered or, in the worst case, there is a fear that the blocks are not possibly welded mutually. As a result, the quality of the laminated core and a yield in the production are deteriorated.

The present invention is devised by considering the above-described circumstances and it is an object of the present invention to provide a method for manufacturing a laminated core and the laminated core in which boundary positions of laminated blocks can be respectively made to be clear and the boundary positions (welding position) of the laminated blocks can be respectively easily recognized.

Means for Solving the Problems

In order to achieve the above-described object, according to the present invention, a below-described structure is provided.
(1) A method for manufacturing a laminated core including:
 a process that forms a plurality of blocks having a plurality of welding parts of different forms or colors at intervals of prescribed angles in the circumferential direction;
 a process that laminates the plurality of blocks under a state that the blocks are rotated at intervals of the prescribed angles; and
 a process that welds the welding parts having the different forms and colors of the laminated blocks to form integrally the plurality of blocks.
(2) A laminated core having a plurality of laminated blocks characterized in that the blocks respectively have a plurality of welding parts of different forms or colors in the circumferential direction, the laminated blocks are laminated under a state that the blocks are rotated at intervals of prescribed angles and the welding parts having the different forms or colors are mutually welded.

Advantage of the Invention

In the method for manufacturing a laminated core and the core according to the present invention, since forms or colors of welding parts of laminated blocks to be welded are different, areas to be welded can be easily visually recognized and operation efficiency can be improved. Further, when it is decided whether or not the welding parts having different forms or colors are mutually welded, whether or not the laminated core is a good product can be easily decided. Thus, inspection efficiency is improved. Accordingly, the high quality laminated core in which the blocks are assuredly welded can be stably supplied.

MODE FOR CARRYING OUT THE INVENTION

As shown in FIG. 1A to FIG. 1D, a laminated core 10 according to a first exemplary embodiment of the present invention is formed in such a way that a plurality (six in an illustrated example) of blocks 12 are laminated under a state that the blocks are rotated at intervals of prescribed angles (120° in the illustrated example) in the circumferential direction and welding parts 13 to 15 of different forms which are respectively provided in the blocks 12 are welded to form integrally the blocks 12.

Figure 2:
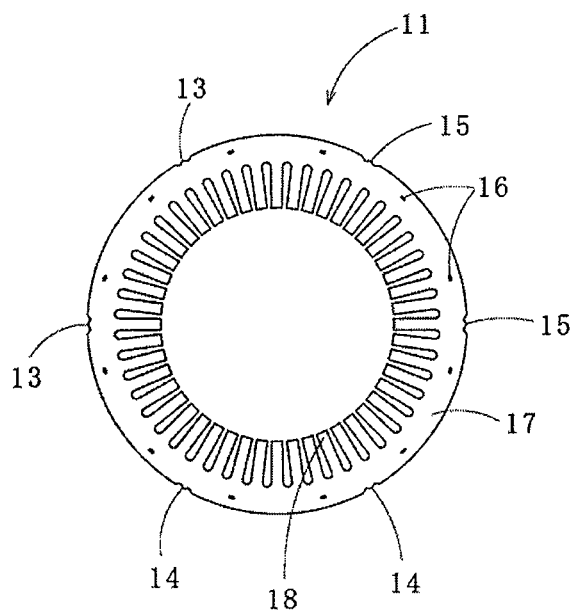
FIG. 2 is a plan view of a core piece forming the laminated core according to the first exemplary embodiment of the present invention.

All the blocks 12 laminated in a plurality of piles respectively have the same forms and are respectively formed by laminating a prescribed number of core pieces 11 shown in FIG. 2 without rotating the core pieces.

The core piece 11 is a plate shaped member obtained by stamping a metal plate substantially in a ring form as shown in FIG. 2. In the core piece 11, magnetic pole parts 18 made of a plurality of irregularities are formed in an inner peripheral side and a yoke piece part 17 is formed in an outer peripheral side. Further, in the core piece 11, a plurality of caulking parts 16 are provided. The plurality of laminated core pieces 11 are formed integrally by caulking the caulking parts 16 adjacent in the direction of lamination to form the block 12.

The caulking part 16 of the core piece 11 located in a lowermost part of the block 12 is a through hole. The caulking part 16 of the core piece 11 located above the core piece 11 of the lowermost part is a V shaped caulking part having a protrusion in a lower side and a recessed part in an upper side. The protrusion of the V shaped caulking part is fitted into the through hole of the core piece 11 of the lowermost part so that the protrusion is not formed in a bottom part of each block 12.

In an outer peripheral edge of each core piece 11, two of three kinds of welding parts 13 to 15 are respectively provided at equal angular positions (at intervals of 120° in the present exemplary embodiment) along the circumferential direction. In this exemplary embodiment, in one core piece 11, the welding parts 13, 13, 14, 14, 15 and 15 are provided in order at intervals of 60°.

Figure 3A:
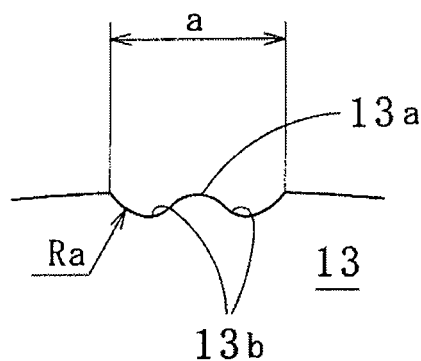
FIG. 3A is an enlarged plan view of a welding part 13 in FIG. 2.
Figure 3B:
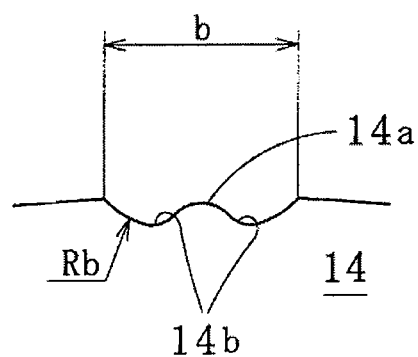
FIG. 3B is an enlarged plan view of a welding part 14 in FIG. 2.
Figure 3C:
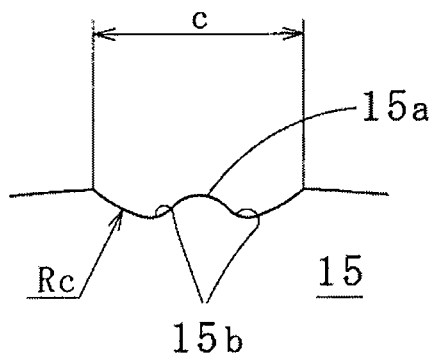
FIG. 3C is an enlarged plan view of a welding part 15 in FIG. 2.

As shown in FIG. 3A to 3C, the welding parts 13 to 15 have circular arc shaped protruding parts 13a to 15a and circular arc shaped cut out parts 13b to 15b located at both sides thereof. The sizes and forms of the protruding parts 13a to 15a of the welding parts 13 to 15 are mutually equal. When the plurality of blocks 12 are piled, the protruding parts 13a to 15a are continuous in the vertical direction (the direction of lamination).

On the other hand, the cut out parts 13b to 15b of the welding parts 13 to 15 are respectively different in their sizes and forms. Specifically, a radius of curvature Ra of the cut out part 13b and a distance a are the smallest, a radius of curvature Rc of the cut out part 15b and a distance c are the largest and a radius of curvature Rb of the cut out part 14b and a distance b are intermediate between them.

A prescribed number of core pieces 11 formed as described above are laminated in such a way that their welding parts 13 to 15 are respectively located in the same positions in the circumferential direction and the caulking parts 16 are caulked together to form the block 12. Accordingly, in the block 12, the welding parts 13 to 15 of the same forms are continuous in the vertical direction.

The plurality of blocks 12 formed in such a way as described are laminated under a state that the blocks are rotated at intervals of prescribed angles (120° in the present exemplary embodiment) in the circumferential direction to form the laminated core 10.

Figure 1A:
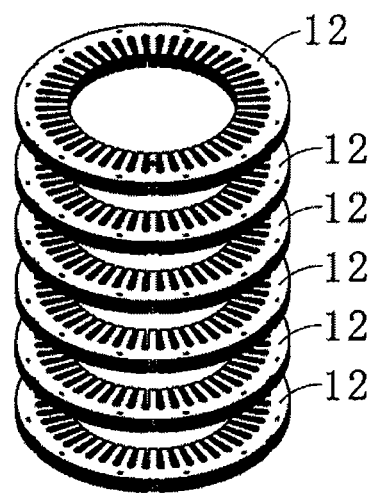
FIG. 1A is a process diagram showing a method for manufacturing a laminated core according to a first exemplary embodiment of the present invention.
Figure 1B:
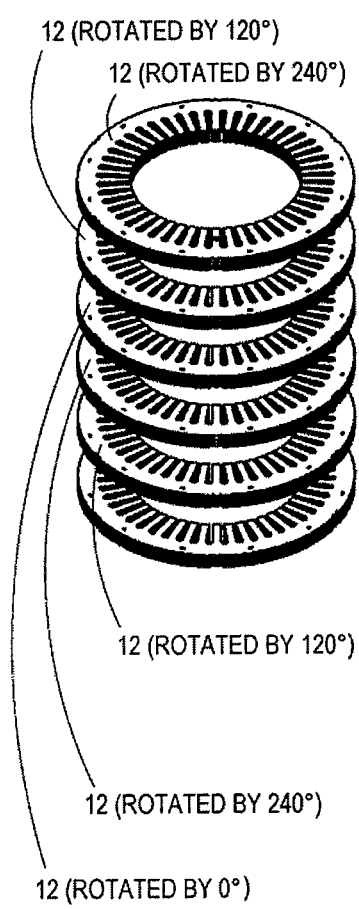
FIG. 1B is a process diagram showing the method for manufacturing a laminated core according to the first exemplary embodiment of the present invention.
Figure 1C:
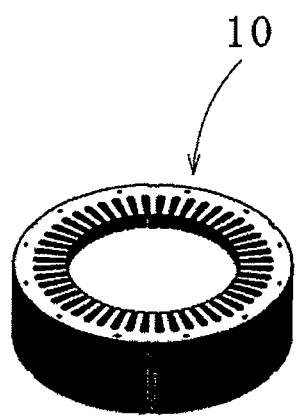
FIG. 1C is a process diagram showing the method for manufacturing a laminated core according to the first exemplary embodiment of the present invention.
Figure 1D:
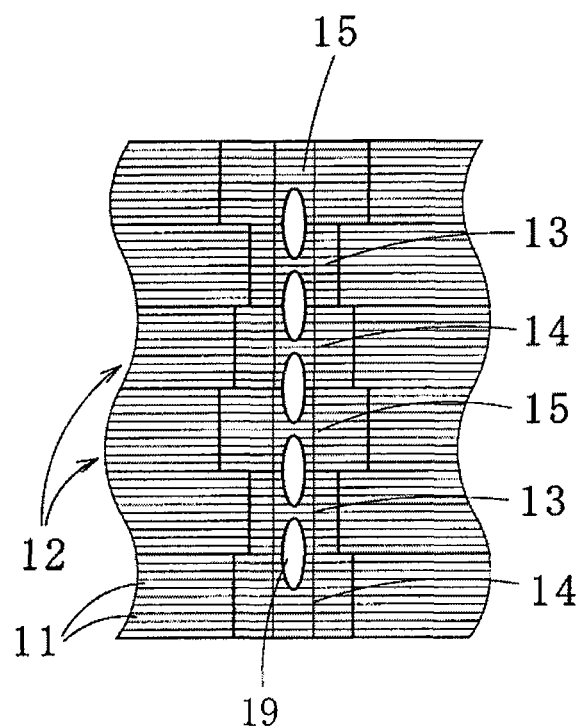
FIG. 1D is a partly omitted front view of the laminated core according to the first exemplary embodiment of the present invention.

Accordingly, as shown in FIG. 1D, since the forms of the protruding parts 13a to 15a of the welding parts 13 to 15 are mutually the same, the protruding parts 13a to 15b are continuous in the vertical direction. As described above, since parts to be welded are continuous in the vertical direction, when melting parts 19 are formed in the protruding parts 13a to 15a having the same forms, the blocks 12 can be assuredly formed integrally by welding.

In addition thereto, in the present exemplary embodiment, since the blocks 12 are laminated under a state that the blocks are rotated at intervals of 120°, and the forms of the cut out parts 13b to 15b of the welding parts 13 to 15 are different at intervals of 120°, as shown in FIG. 1D, in boundary positions of the blocks 12, the welding parts 13 to 15 having different forms are adjacent in the vertical direction. Accordingly, when the welding parts 13 to 15 having the different forms are welded together, the blocks 12 located in upper and lower parts can be formed integrally. As described above, since the forms of the welding parts 13 to 15 are different in the boundary positions of the blocks 12 to be welded, positions to be welded can be clearly recognized to improve operation efficiency in a welding operation.

In other words, in the laminated core 10 according to the present exemplary embodiment, since the welding parts having the different forms are welded together, when it is decided whether or not the melting parts 19 are formed to extend over the welding parts 13 to 15 having the different forms, whether or not the blocks 12 are respectively mutually welded can be easily decided. Accordingly, an inspecting operation of a product can be greatly improved.

Subsequently, a laminated core and a method for manufacturing the laminated core according to second to fourth exemplary embodiments of the present invention shown in FIGS. 4A to 6C will be described below. In the second to fourth exemplary embodiments, since only forms of welding parts are different from those of the above-described exemplary embodiment and other structures than the welding parts are the same, an explanation of other parts than the welding parts will be omitted.

Figure 4A:
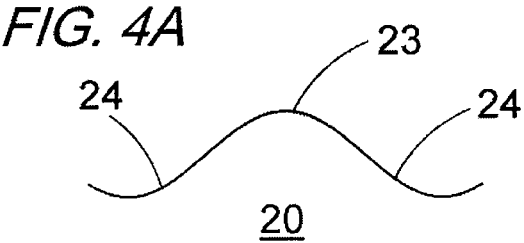
FIG. 4A is an enlarged plan view of a welding part 20 of a laminated core according to a second exemplary embodiment of the present invention.
Figure 4B:
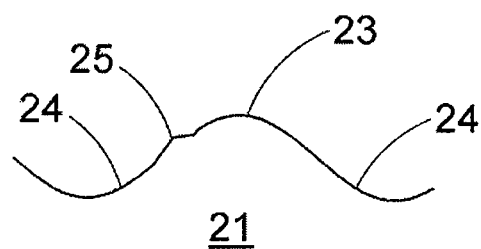
FIG. 4B is an enlarged plan view of a welding part 21 of the laminated core according to the second exemplary embodiment of the present invention.
Figure 4C:
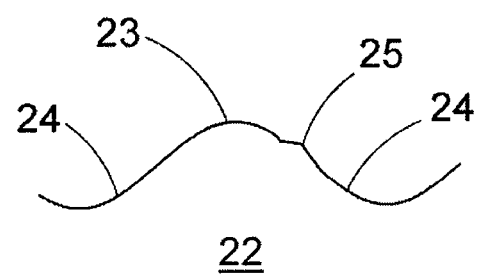
FIG. 4C is an enlarged plan view of a welding part 22 of the laminated core according to the second exemplary embodiment of the present invention.

In the second exemplary embodiment shown in FIGS. 4A to 4C, similarly to FIG. 2 in the first exemplary embodiment, in an outer peripheral edge of a core piece 11 along a circumferential direction, two of three kinds of welding parts 20 to 22 are respectively provided at equal intervals of 60° in the circumferential direction.

As shown in FIG. 4A, the welding part 20 has a protruding part 23 and cut out parts 24 provided at both sides of the protruding part 23. The welding part 21 has, as shown in FIG. 4B, a protruding part 23, cut out parts 24 provided at both sides of the protruding part 23 and a protrusion 25 provided in one of the cut out parts 24. The welding part 22 has, as shown in FIG. 4C, a protruding part 23, cut out parts 24 provided at both sides of the protruding part 23 and a protrusion 25 provided in the other of the cut out parts 24. Namely, in the present exemplary embodiment, the forms or sizes of the protruding parts 23 and the cut out parts 24 of the welding parts 20 to 22 are the same, however, entire forms of the welding parts 20 to 22 are made to be different from one another depending on the number of protrusions 25 (0 to 2).

The core pieces 11 formed as described above are laminated in such a way that the welding parts 20 to 22 having the same forms are continuous in the direction of lamination and their caulking parts are caulked to obtain a block 12. When the plurality of blocks 12 formed in such a way as described are laminated under a state that the blocks are rotated at intervals of 120° in the circumferential direction, the welding parts 20 to 22 different in the number of protrusions 25 appear in the vertical direction in boundary positions of the blocks 12. In a welding operation, since the welding parts 20 to 22 having the different number of protrusions 25 may be welded. Thus, an efficiency of a welding operation is improved.

Figure 5A:
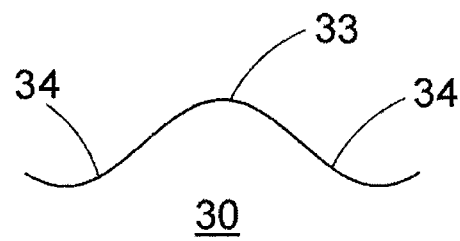
FIG. 5A is an enlarged plan view of a welding part 30 of a laminated core according to a third exemplary embodiment of the present invention.
Figure 5B:
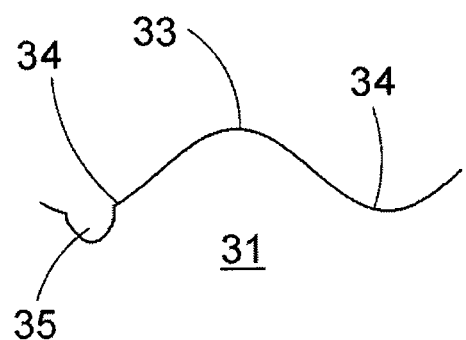
FIG. 5B is an enlarged plan view of a welding part 31 of the laminated core according to the third exemplary embodiment of the present invention.
Figure 5C:
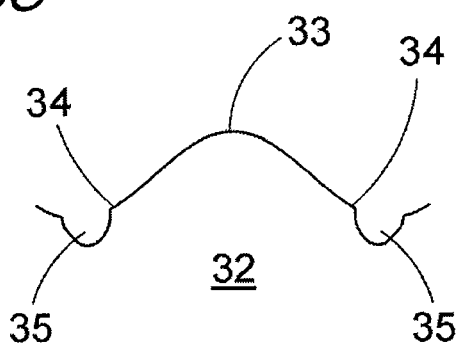
FIG. 5C is an enlarged plan view of a welding part 32 of the laminated core according to the third exemplary embodiment of the present invention.

In the third exemplary embodiment shown in FIGS. 5A to 5C, similarly to FIG. 2 in the first exemplary embodiment, in an outer peripheral edge of a core piece 11 along a circumferential direction, two of three kinds of welding parts 30 to 32 are respectively provided at equal intervals of 60° in the circumferential direction.

As shown in FIG. 5A, the welding part 30 has a protruding part 33 and cut out parts 34 provided at both sides of the protruding part 33. The welding part 31 has, as shown in FIG. 5B, a protruding part 33, cut out parts 34 provided at both sides of the protruding part 33 and a recessed part 35 provided in one of the cut out parts 34. The welding part 32 has, as shown in FIG. 5C, a protruding part 33, cut out parts 34 provided at both sides of the protruding part 33 and recessed parts 35 provided in both the cut out parts 34. Namely, in the present exemplary embodiment, the forms or sizes of the protruding parts 33 and the cut out parts 34 of the welding parts 30 to 32 are the same, however, entire forms of the welding parts 30 to 32 are made to be different from one another depending on the number of the recessed parts 35.

In the present exemplary embodiment, when a block 12 is formed from the iron pieces 11 in the same manner as described above and the blocks 12 are laminated, boundary positions of the blocks 12 can be clearly identified respectively depending on the number of the recessed parts 35 of the welding parts 30 to 32. Accordingly, an efficiency of a welding operation can be improved.

Figure 6A:
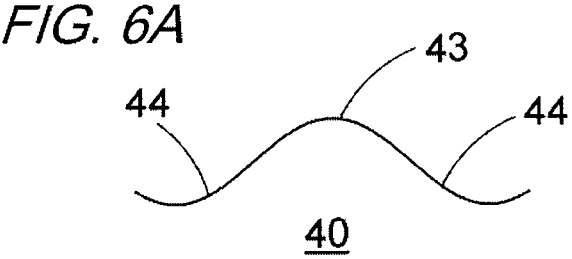
FIG. 6A is an enlarged plan view of a welding part 40 of a laminated core according to a fourth exemplary embodiment of the present invention.
Figure 6B:
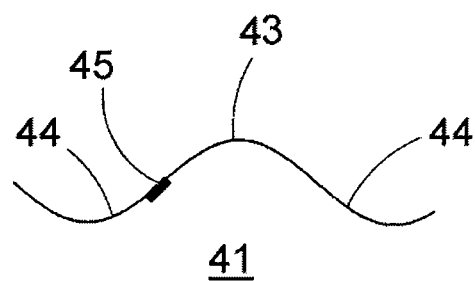
FIG. 6B is an enlarged plan view of a welding part 41 of the laminated core according to the fourth exemplary embodiment of the present invention.
Figure 6C:
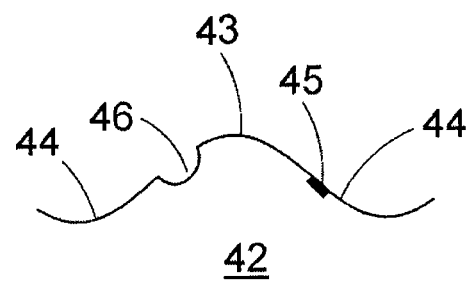
FIG. 6C is an enlarged plan view of a welding part 42 of the laminated core according to the fourth exemplary embodiment of the present invention.

In the fourth exemplary embodiment shown in FIGS. 6A to 6C, similarly to FIG. 2 in the first exemplary embodiment, in an outer peripheral edge of a core piece 11 along a circumferential direction, two of three kinds of welding parts 40 to 42 are respectively provided at equal intervals of 60° in the circumferential direction.

As shown in FIG. 6A, the welding part 40 has a protruding part 43 and cut out parts 44 provided at both sides of the protruding part 43. The welding part 41 has, as shown in FIG. 6B, a protruding part 43, cut out parts 44 provided at both sides of the protruding part 43 and an eye mark 45. The welding part 42 has, as shown in FIG. 6C, a protruding part 43, cut out parts 44 provided at both sides of the protruding part 43, an eye mark 45 and a recessed part 46.

Namely, in this exemplary embodiment, the forms or sizes of the protruding parts 43 and the cut out parts 44 of the welding parts 40 to 42 are the same, however, entire forms of the welding parts 40 to 42 are made to be different from one another depending on whether or not the eye mark 45 or the recessed part 46 is formed and a position where the eye mark or the recessed part is formed. The eye mark 45 or the recessed part 46 may be formed in either the protruding part 43 or the cut out part 44.

The eye mark 45 may be provided by a press work or colored by painting or formed by making a surface different by using a chemical reaction such as etching.

In the present exemplary embodiment, when a block 12 is formed from the iron pieces 11 in the same manner as described above and the blocks 12 are laminated, boundary positions of the blocks 12 can be clearly identified respectively depending on whether or not the eye mark 45 and/or the recessed part 46 is respectively formed in the welding parts 40 to 42. Accordingly, an efficiency of a welding operation can be improved.

Depending on the position where the eye mark 45 and the recessed part 46 are formed or whether or not the eye mark and the recessed part are formed and the number of them, three or more of welding parts having different forms or colors can be obtained. Further, in place of the recessed part 46, the protrusion 25 of the second exemplary embodiment may be formed. A plurality of kinds of welding parts may be formed by combining together the eye mark 45, the recessed part 46 and the protrusion 25. Further, even when the recessed part 46 or the protrusion 25 is not provided and only the eye mark 45 is provided in a structure, the boundary positions of the blocks 12 can be identified. For instance, when six kinds of welding parts are formed, blocks 12 may be laminated under a state that the blocks 12 are rotated at intervals of 360°/6=60° to form a laminated core 10.

The present invention is described in detail by referring to the specific exemplary embodiments and it is apparent to a person with ordinary skill in the art that various kinds of changes or modification can be made without deviating from the spirit and scope of the present invention. For instance, in the above-described exemplary embodiments, the number of the welding parts is set to six in the circumference, however, the number of the welding parts may be more decreased or increased.

The application of the present invention is based on Japanese Patent Application (JPA No. 2009-117839) filed on May 14, 2009 and contents thereof are incorporated herein as a reference.

INDUSTRIAL APPLICABILITY

In the method for manufacturing a laminated core and the core according to the present invention, since the forms or colors of the welding parts of the laminated blocks to be welded are different, the areas to be welded can be easily visually recognized. Accordingly, an operation efficiency can be improved. Further, when it is decided whether or not the welding parts having the different forms or colors are mutually welded, whether or not the laminated core is a good product can be easily decided. Thus, inspection efficiency is improved. Accordingly, the high quality laminated core in which the blocks are assuredly welded can be stably supplied.

The invention claimed is:

1. A method for manufacturing a laminated core, the method comprising:
    a process that forms a plurality of blocks having a plurality of welding parts of different forms or colors at intervals of prescribed angles in the circumferential direction and on the peripheral edge of each of the plurality of blocks;
    a process that laminates the plurality of blocks in a state where each of the plurality of blocks are positioned at intervals of the prescribed angles; and
    a process that welds the plurality of welding parts, having the different forms or colors, together in a lamination direction to integrally form the plurality of blocks as the laminated core.

2. The method according to claim 1, further comprising each of the plurality of welding parts being defined by an arc shaped protrusion and an arc shaped cutout, wherein the arc shaped protrusions are provided having a same shape as each other, and wherein the arc shaped cutouts are provided having a different shape from each other.

3. A laminated core, comprising:
    a plurality of blocks laminated together and having a plurality of welding parts of different forms at intervals of prescribed angles in the circumferential direction and on the peripheral edge of each of the plurality of blocks, wherein the different forms of each of the plurality of welding parts being defined by a protruding part and a cut out part, the protruding parts having the same shape as each other, and the cut out parts having a different shape from each other, and
    wherein the plurality of blocks are laminated in a state where each of the plurality of blocks are positioned at intervals of the prescribed angles and the welding parts, having the different forms, are welded together in a lamination direction.

* * * * *